United States Patent
Sridhar

(10) Patent No.: US 11,524,842 B2
(45) Date of Patent: Dec. 13, 2022

(54) INCENTIVIZED MULTI-STREAM RECYCLING SYSTEM WITH FILL LEVEL, VOLUME, WEIGHT, COUNTERS, SHREDDER, COMPACTOR, CONSUMER IDENTIFICATION, DISPLAY AND LIQUID DRAINAGE SYSTEM

(71) Applicant: SourceRecycle, Inc., Centreville, VA (US)

(72) Inventor: Mirajkar Venkobarao Sridhar, Centreville, VA (US)

(73) Assignee: SourceRecycle, Inc., Centreville, VI (US)

( * ) Notice: Subject to any disclaimer, the term of this patent is extended or adjusted under 35 U.S.C. 154(b) by 292 days.

(21) Appl. No.: 16/716,747

(22) Filed: Dec. 17, 2019

(65) Prior Publication Data

US 2020/0189844 A1 Jun. 18, 2020

Related U.S. Application Data

(60) Provisional application No. 62/780,490, filed on Dec. 17, 2018.

(51) Int. Cl.
*B65F 1/14* (2006.01)
*G06F 16/9035* (2019.01)
(Continued)

(52) U.S. Cl.
CPC .......... *B65F 1/1484* (2013.01); *B65F 1/1405* (2013.01); *G06F 16/9035* (2019.01);
(Continued)

(58) Field of Classification Search
None
See application file for complete search history.

(56) References Cited

U.S. PATENT DOCUMENTS

| | | | | |
|---|---|---|---|---|
| 5,078,567 A | * | 1/1992 | Lombardo | B65F 3/001 220/909 |
| 5,222,853 A | * | 6/1993 | Carson | B65F 1/004 414/408 |

(Continued)

FOREIGN PATENT DOCUMENTS

WO WO-2019102440 A1 * 5/2019

*Primary Examiner* — Jan P Mincarelli
(74) *Attorney, Agent, or Firm* — Dave Law Group LLC; Raj S. Dave

(57) ABSTRACT

An embodiment relates to a trash collection device comprising a trash receptacle with a unique identification and an opening to receive a class of trash; an identification scanner for recognizing a user; a trash item counter; a fill level sensor; a display configured to interact with the user; a compactor; a solar panel configured to charge a battery; a data communicator configured to communicate date to a cloud storage; a processor configured to generate incentive for the user; wherein the trash collection device is configured to be modular and configurable to connect with another similar trash collection device to enable to collect additional trash class and is configured to interact with each other through a common software. The device, method and system are further used to generate recycling analytics by using the stored data to provide incentives to users and to facilitate planning of downstream operations.

20 Claims, 12 Drawing Sheets

(51) Int. Cl.
  *G06Q 30/00* (2012.01)
  *G06Q 30/02* (2012.01)
  *G06Q 10/06* (2012.01)
  *H04W 4/80* (2018.01)
  *G06Q 10/00* (2012.01)

(52) U.S. Cl.
  CPC ....... *G06Q 10/06312* (2013.01); *G06Q 10/30* (2013.01); *G06Q 30/01* (2013.01); *G06Q 30/0226* (2013.01); *H04W 4/80* (2018.02); *B65F 2210/128* (2013.01); *B65F 2210/1443* (2013.01); *B65F 2210/168* (2013.01); *B65F 2210/172* (2013.01); *B65F 2210/184* (2013.01); *B65F 2240/00* (2013.09)

(56) References Cited

U.S. PATENT DOCUMENTS

| | | | | |
|---|---|---|---|---|
| 5,413,448 | A * | 5/1995 | Peshkin | B65F 1/1468 414/679 |
| 6,309,164 | B1 * | 10/2001 | Holder | B65F 3/02 414/420 |
| 2005/0115207 | A1 * | 6/2005 | Chomik | B65B 9/15 53/459 |
| 2006/0212307 | A1 * | 9/2006 | Mallett | A61B 50/36 209/702 |
| 2011/0225098 | A1 * | 9/2011 | Wolff | G06Q 10/30 705/308 |
| 2012/0010746 | A1 * | 1/2012 | Sundholm | G06Q 50/28 700/226 |
| 2014/0025589 | A1 * | 1/2014 | Yang | B65F 1/1426 705/308 |
| 2017/0372272 | A1 * | 12/2017 | Wadden | B65F 1/006 |
| 2019/0332093 | A1 * | 10/2019 | Isham | G06Q 10/06 |

* cited by examiner

INCENTIVIZED MULTI-STREAM RECYCLING SYSTEM WITH FILL LEVEL, VOLUME, WEIGHT, COUNTERS, SHREDDER, COMPACTOR, CONSUMER IDENTIFICATION, DISPLAY AND LIQUID DRAINAGE SYSTEM

CROSS-REFERENCE TO RELATED APPLICATIONS

This application claims benefit under 35 U.S.C. § 119(e) from U.S. Provisional Application No. 62/780,490, filed Dec. 17, 2018, which is incorporated herein by reference in its entirety.

TECHNICAL FIELD

The present disclosure relates to a device, method and system for tracking materials dropped at any of the trash collecting facility, associating a customer from a customer database on who is dropping the trash from any of the locations where such trash collecting facility is setup and incentivization of such recycling activities.

BACKGROUND

In the US, currently, the trash is collected in Single Stream Recycling (SSR) and about 75% of the waste goes into a landfill. Single-stream recycling is a system in which all kinds of recyclables such as plastics, paper, metal, and glass are placed in a single curbside bin by consumers. The recyclables are then collected and transported to a material recovery facility (MRF) where they are sorted and processed. This system is also called commingled or single-sort recycling. A benefit of this approach is that consumers, or the depositors, don't have to separate or sort the recyclables. Rather, they are encouraged to put everything into a single bin. However, it has contributed to higher contamination rates, such as mixed cardboard items containing glues and inks; and thus, less recovery or recycle rates are realized.

One of the primary reasons why recycling is low is because of the waste not being sorted into multi-stream or multi class items at the source. When waste is not sorted into paper, plastic, glass, aluminum, etc., then the recycling rates are lower downstream due to contamination and mixed waste segregation problems. Sometimes, even when waste is sorted in multi-stream, the downstream operations are not planned or designed to support the multi class waste collection facilities, thus resulting in downstream operations collecting the waste into a single stream.

Over the past few decades, costs for collecting and disposing waste have skyrocketed. Decreases in available landfill capacity have caused the cost associated with disposing of waste in such landfills to increase. Adding to these costs are governmental (e.g., federal, state, and local) landfill taxes, which have also increased sharply over the past few decades. Even where landfill capacity exists, the cost associated with potential and actual environmental hazards associated with landfill operations are likewise increasing. These costs can include, for example, losses of valuable property and environmental cleanup costs for rehabilitating landfills and surrounding areas that become contaminated with dangerous chemicals due to the disposal and decomposition of the waste. Given the financial and environmental burdens associated with the collection and disposal of waste, municipalities have actively pursued recycling as an alternative to disposal.

By far the most common waste disposal method, used by consumers, is to dispose all types of waste into a common waste receptacle resulting in immediate mixing and contamination of the waste. Specifically, wastepaper products, plastic products, and food waste end up being thrown into the same common waste receptacle, and then typically subsequently transferred to a garbage can or dumpster for transportation to a waste disposal location (e.g., landfill) or a waste collection/processing location. The waste is immediately contaminated while sitting in the individual disposable container, and continues to be further contaminated with time, transportation, and handling prior to final disposal, collection and/or processing.

Residential consumers, communities, organizations, localities, firms, etc. generate a large amount of waste and recyclable materials that must be disposed of on a periodic basis. In more urban settings, municipalities or private service providers will generally come to residential and/or business locations and pickup waste and/or recyclable materials at curbside. In the past, identifying these materials and their quantity was not an issue. More recently, however, many municipalities have begun charging for waste pickup based on the quantity of waste material or have instituted forced recycling programs sometimes adding an incentive for recycling. In the case of charging for waste pickup, some municipalities have begun selling and accepting only certain types or colors of waste refuse bags, thereby creating a Pay-for-disposal waste program.

Recently, there are some stores attempting to separate and collect different types of waste by using multiple waste receptacles marked for a particular type of waste. However, it is not evident if this separated waste is stored, maintained, and/or picked up separately from these stores, based on the particular type of waste. It is subsequently mixed together, for example, by being thrown together into the same dumpster prior to transportation from a store and thus the efforts that are put into sorting and collecting become futile.

Fortunately, demand for recyclable material has increased as a result of expansion in manufacturing. Manufacturers have long recognized that manufacturing goods from recyclable material is less costly than manufacturing such goods from virgin material due to, for example, the costs associated with extracting and processing the virgin material into useable form.

Recycling activities, such as recycling newspapers, cans, and bottles, have been widely encouraged and desired for at least several decades. However, there is no easy modality by which people may receive immediate positive feedback for recycling in the form of data about the impact of individual or other acts of recycling. While aggregate data may be available, in order to determine the positive impact of recycling, people are forced to seek out such information on their own. For people not used to recycling, not apprised of the data, or for people unable to easily obtain such data, it is difficult to understand and appreciate the actual impact of each act of recycling thus damping the good acts in the long run.

One of the emerging technologies to help tracing the track is through Radio Frequency Identification (RFID) which has found applications in waste management. RFID technology is being used by municipalities and private waste collectors in a variety of ways to improve the efficiency of the waste operation. Examples of waste management RFID applications include incentive based recycling schemes and new waste collection cost models, as explained here below. RFID technology can enable the deployment of incentive based recycling schemes. One example is the city of Philadelphia's RECYCLEBANK®. Each resident receives a waste bin, which has been fitted with an RFID tag to identify the associated household. Recycling waste trucks or vehicles are fitted with RFID readers and weighing capability. As each RFID tagged bin is lifted by the waste truck or vehicle, the household is identified from the RFID tag fitted to the bin and associated with a customer in a customer database, the bin is weighed, and the data is logged to the RECYCLEBANK® database. RECYCLEBANK® can track the recycle weight per household per month, and the household receives discount coupons that can be redeemed at predetermined retailers based on the recycle weight.

Recycling reduces the financial and environmental burdens of waste disposal, reduces energy costs, and conserves our environments resources. There is, therefore, a need to establish recycling initiatives which recognize the existing problems associated with the disposal of waste and promote recycling efforts towards effective waste management.

U.S. patent application Ser. No. 14/545,984 discloses an electronic waste tracking device, process, and system to track waste from one location to another location; however, it doesn't track users who are recycling and thus doesn't provide any incentives to any of those who are recycling. U.S. patent application Ser. No. 13/754,877 discloses measurement of environmental impact of energy use reduction and recycling activities and incentivization of such activities; however, it doesn't identify the receptacle, or where such activity is taken place, or how much of such activity is taking place in a particular location. U.S. patent application Ser. No. 12/189,218 discloses a system and method of providing incentive to recycle recyclable materials by providing financial incentives to consumers for recycling at a central drop-off recycling facility. However, such a facility accepts mixed waste and sorts it out independently of the user and thus it is not connected completely with the waste recycling system, and the data is not available for any downstream operations. U.S. patent application Ser. No. 12/779,497 elaborately discloses methods on tracking materials picked up at a customer location, a system and method for automatically associating a customer from a customer database with a unique identifier (id) device placed on the recyclable material container. Such cases have many problems and are infrastructure intensive, due to one customer requiring multiple bins of the same id for each class and the customer not being identifiable from anywhere except where his bin is registered. Also, if any other person carries the bin, even if it is not the actual customer, the reward is falsely associated with the original customer. U.S. patent application Ser. No. 13/998,135 discloses a system and method for electronically tracking the disposable waste container containing the targeted waste from the on-site waste container to a remote recycling location; however, the system can only track data from a specific location. Prior art discloses a system and method of providing incentive to recycle recyclable materials by providing financial incentives to consumers for recycling at a recycling kiosk. Prior art discloses an incentive based recycling system and method specifically towards a community-based recycling effort. U.S. patent application Ser. No. 12/189,218 discloses a system and method for financial incentives to consumers for recycling at a central drop-off recycling facility. U.S. patent application Ser. No. 14/092,480 discloses an interactive waste receptacle for compacting and processing waste; detecting proximal images, sounds, and smells, and displaying advertisements, text, graphics, animation, video, audio, and games. Apart from the above disclosed references, many other patents disclose methods and systems on waste receptacles, incentives, recycling methods, machines, and waste management; however, none of them discusses a connection between the networked bins from various locations to identify a customer from anywhere, have the rewards sent through an application (App) on which a user can redeem through his mobile phone application, aggregate the data at a centralized location where the data analytics and downstream operations are facilitated.

What is needed is a system and method for identifying who is recycling, what is being recycled, how much is recycled, when and where it is being recycled. Once the systems and methods are in place to generate the above data, it can be easily configured to imbibe positive feedback to the customers for recycling through direct or indirect incentives.

SUMMARY

An embodiment relates to a trash collection device comprising: a trash receptacle with a unique identification and an opening to receive a class of trash; an identification scanner for recognizing a user; a trash item counter; a fill level sensor; a display configured to interact with the user; a compactor; a solar panel configured to charge a battery; a data communicator configured to communicate date to a cloud storage; a processor configured to generate incentive for the user; wherein the trash collection device is configured to be modular and configurable to connect with another similar trash collection device to enable to collect additional trash class and is configured to interact with each other through a common software.

In an embodiment, the trash receptacle is configured to collect a particular type of trash class. In an embodiment, the trash receptacle comprises of an identification sequence and a combination of date and time of initialization, location, client information, client identification, contact information, billing information, trash type, date, and time, whether the trash receptacle is partially filled or fully filled, weight when filled, date and time of removal of the trash receptacle, logging information. In an embodiment, the identification scanner for recognizing a user is by a Radio Frequency Identification (RFID); wherein Radio Frequency Identification tag for recognizing a user comprises of and a combination of date and time of joining, location, user information, contact information, phone number. In an embodiment, the trash item counter is a Laser guided scanner. In an embodiment, the fill level sensor is a wireless ultrasonic sensor. In an embodiment, the display is configured to interact with the user display data on trash recycled by a user, or on rewards gained by a user, or on trash recycled by a trash collection device, or on a group of trash collection devices, or on a group of another trash collection device connected within a network. In an embodiment, the compactor is an electromechanical, modular, single column with a ram to compress trash, wherein the compactor is configurable to be optional and removable. In an embodiment, the data communicator to the cloud storage is through a wireless network. In an embodiment, the processor configured to generate incentive for the user uses recycling data of the user and/or advertising material of a sponsor. In an embodiment, the trash collection device is enabled to dump trash to a dump truck through a back opening for unloading through an electronic lock disposal mechanism. In an embodiment, data on the cloud storage from the trash collection device is configured with a mobile application for interaction of the user to read statistics of the user on recycling and to redeem rewards of the user. In an embodiment, the trash collection device is configured to be a trash collection facility; wherein the trash collection facility comprises a plurality of trash collection facilities that are interconnected to form a network having access to a centralized database. In an embodiment, the trash collection device is further configurable to collect liquids.

Another embodiment relates to a system comprising: a plurality of trash collection devices communicating with each other over a wireless network; a database of registered users; data on recycling to and from a cloud storage; a processor configured to interact with the cloud storage to process and analyze the data from the plurality of trash collection devices and to associate with a plurality of users using the plurality of trash collection devices; a mobile application to interact with the cloud storage and generate a user statistic on recycling and an incentive for the plurality of users.

In an embodiment, each trash collection device has a unique identification and the system is configured to add new trash collection devices. In an embodiment, a database of registered users is configured to maintain and add new users. In an embodiment, the data on recycling to and from the cloud storage is configured to be accessed through a wireless network. In an embodiment, the processor configured to interact with the cloud storage to process and analyze data from the plurality of trash collection devices and to associate with the plurality of users using the plurality of trash collection devices is further configured to generate incentives based on recycling data of the plurality of users and/or advertising material of a sponsor. In an embodiment, a mobile application to interact with the cloud storage and generate a user statistic on recycling and an incentive for the plurality of users is configured to be redeemable via the mobile application.

Another embodiment relates to a multi-stream system comprising: a plurality of trash collection devices communicating with each other over a wireless network; data on recycling to and from a cloud storage by the plurality of trash collection devices; a processor configured to interact with the cloud storage to process and analyze the data from the plurality of trash collection devices; a garbage pickup vehicle configured to pick up multi-class garbage.

In an embodiment, the plurality of trash collection devices is configured to dump trash to a dump truck through an opening, opposite to the opening to receive a trash class, for unloading through an electronic lock disposal mechanism. In an embodiment, a plurality of trash collection devices is configured to open independently of the other. In an embodiment, the data on recycling to and from the cloud storage by the plurality of trash collection devices accessed is through a wireless network. In an embodiment, the processor configured to interact with the cloud storage to process and analyze the data from the plurality of trash collection devices is configured to analyze data of garbage collection by a plurality of users, by trash collection device, by a group of trash collection devices, by location or locality, by a client, by trash class, by group of trash classes, by a county, by city or by any other criteria that is desired. In an embodiment, the data analyzed is further configured to display analytics on any configured device connected to the cloud storage and having access to the data. In an embodiment, the data analyzed is further configured to enable a Customer Relationship Management (CRM) software and/or an Enterprise Resource Planning (ERP) software's to schedule and route garbage pickup vehicles or any other downstream operations in waste management. In an embodiment, the garbage pickup vehicle is configured to pick up a multi-class garbage, wherein garbage pickup vehicle segments are configured to match a number of trash bin segregation units and slot distances. In an embodiment, the garbage pickup vehicle is configured to be a multi-stream garbage pickup vehicle having a plurality of slots or segments within the garbage collecting(/dumping/loading) space of the garbage pickup vehicle configured to pick up multi class garbage wherein the plurality of slots or segments are configured to match a plurality of complimentary slots or segments of a trash collection device.

Among other things, this disclosure provides embodiments of systems and methods for identifying who is recycling, what is being recycled, how much is recycled, when and where it is being recycled.

BRIEF DISCUSSION OF THE DRAWINGS

In the present disclosure, reference is made to the accompanying drawings, which form a part hereof. In the drawings, similar symbols typically identify similar components, unless context dictates otherwise. Various embodiments described in the detailed description, drawings, and claims are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein.

FIG. 1 shows a schematic diagram of SmartBox Ecosystem.

FIG. 2 schematically depicts a SmartBox simplified for waste collection with inlet sensors.

FIG. 3 schematically depicts a SmartBox item counter and Drop slot.

Figure 8:
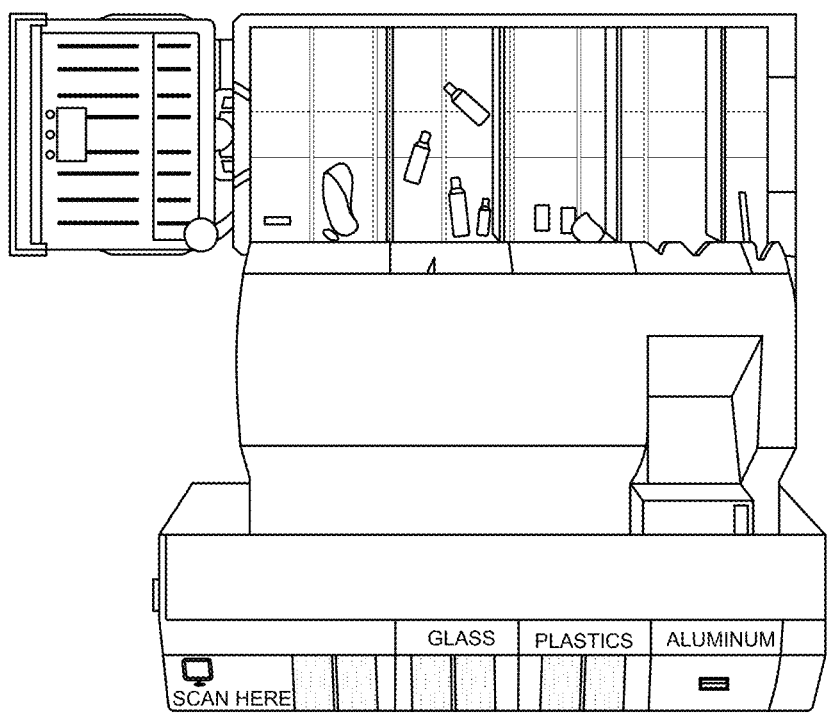
Figure 8:
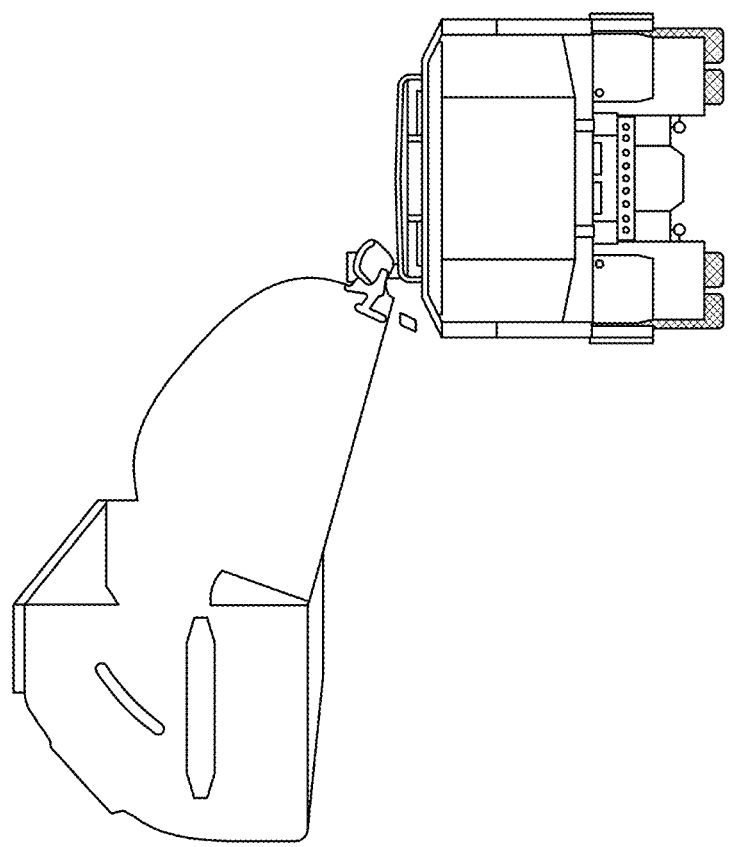

FIG. 8 schematically depicts SmartBox with Multi-stream Automatic Pre-sorted Waste Dispensing and Collection Trough System, Electronic Opening and Closing Lock Mechanism Angled and Aligned Compartments to empty into similarly compartmentalized Trucks for Collection and Separation of Waste, simply, Sorted Waste Disposal Trough and Truck System.

Figure 9:
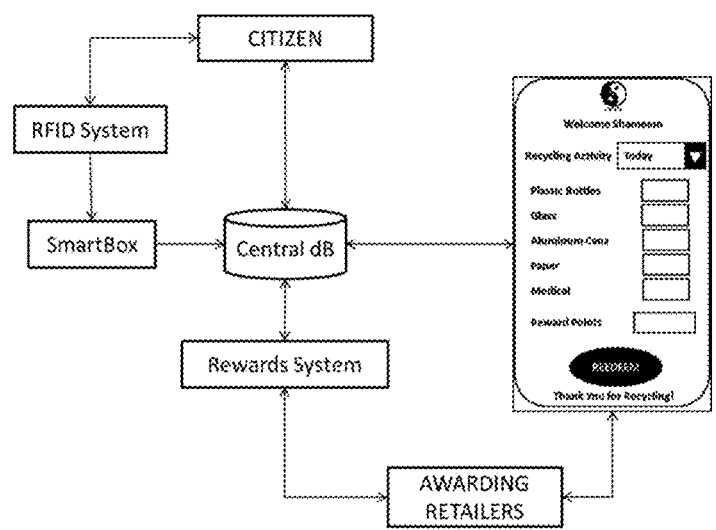

FIG. 9 schematically depicts SmartBox Identifying and Associating Citizen with Recycling Bin and Items Recycled, Updating Database, Computing Rewards/Incentive from Retailers.

Figure 10:

FIG. 10 schematically depicts SmartBox with Electronic Display and Citizen-Interaction Unit, Voice and Color enabled.

Figure 11:
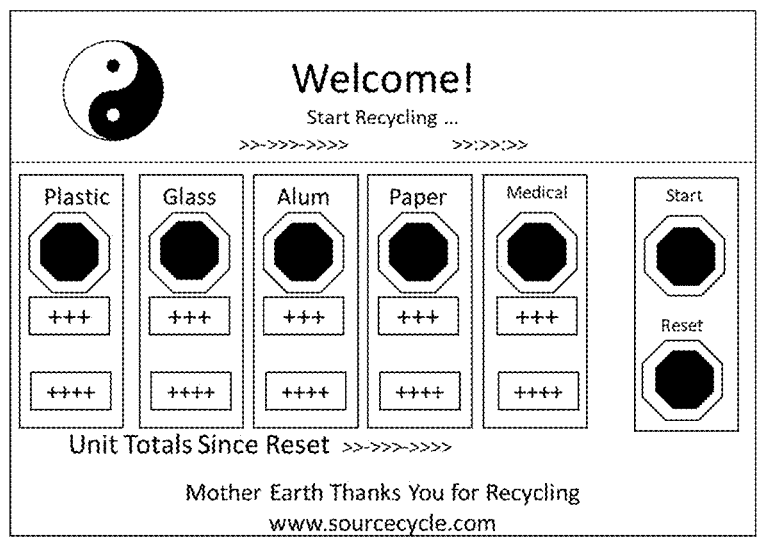

FIG. 11 schematically depicts SmartBox with Display Layout of Tracked Data on Bin of a Particular Facility.

Figure 12:
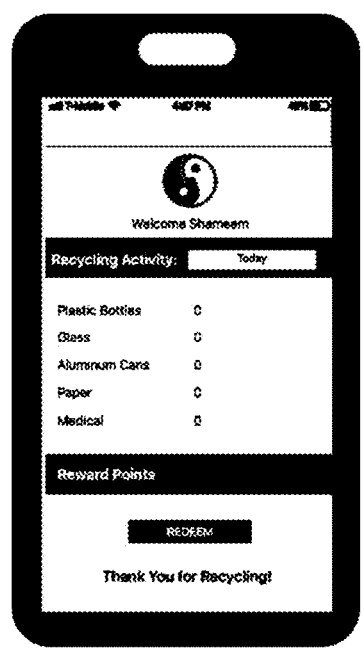

FIG. 12 schematically depicts SmartBox Mobile Application Mockup.

DETAILED DESCRIPTION

All publications, patents, and patent applications cited in this Specification are hereby incorporated by reference in their entirety.

The singular forms "a," "an" and "the" are used herein to refer to one or to more than one (i.e., to at least one) of the grammatical object of the article. By way of example, "a component" means one component or more than one component.

Any ranges cited herein are inclusive.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent, or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other specific forms without departing from its spirit or characteristics. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, the trash recycling methodologies described herein are those well-known and commonly used in the art.

Before the present methods and systems are described, it is to be understood that this disclosure is not limited to the particular processes, methods and devices described herein, as these may vary. It is also to be understood that the terminology used herein is for the purpose of describing the particular versions or embodiments only and is not intended to limit the scope of the present disclosure which will be limited only by the appended claims. Nothing in this disclosure is to be construed as an admission that the embodiments described in this disclosure are not entitled to antedate such disclosure by virtue of prior invention. As used in this document, the term "comprising" means "including, but not limited to.

As used herein, the term component is intended to be broadly construed as hardware, firmware, and/or a combination of hardware and software.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example without limitation, a PLC (Programmable Logic Controller), an FPGA (field programmable gate array), an ASIC (application specific integrated circuit), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Embodiments of the present invention may comprise or utilize a special purpose or general-purpose computer including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The foregoing disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. The identification by RFID mentioned in the invention may also be achieved via other identification means like biometric id, password, magnetic id card etc.

Those skilled in the art will appreciate that network connectivity may be achieved through a variety of means like mobile data connection, Wi-Fi, DSL, cable, satellite, Bluetooth etc.

The following terms and phrases, unless otherwise indicated, shall be understood to have the following meanings.

Definitions

SmartBox: is a recycle bin/refuse collector/receptacle/container/dustbin/refuse bin/trash bin/trash receptacle with a software and hardware module and a unique ID. Also referred to as a Master.

Master: refers to as SmartBox.

Citizen: Any person who is recycling and is also referred to as a user, a person, a customer, or a consumer.

Trash: also referred as refuse, waste, garbage, junk, rubbish either recyclable or not;

Trash Class: trash belong to a particular group such as soda cans, glass, paper, cardboard, metal; or a subgroup such as Aluminum within a metal group.

Incentive: a thing that motivates or encourages someone to do something either monetary or non-monetary such as a reward, coupon, a praise, etc.

Waste pickup truck: Any garbage pickup vehicle or truck or any vehicle that is designated to collect the trash or waste from one or more locations.

Multi Class or Multi-stream: refers to the concept of more than one type of trash class.

Trash collection facility: a facility formed at any location as an example near residential, inside residential, commercial, industrial, organization or any trash collection point where at least one kind of trash class is collected. Also referred to as trash receiving location.

Multi Class trash collection facility: a facility formed at any location as an example near residential, inside residential, commercial, industrial, organization or any trash collection point where more than one kind of trash class is collected. Also referred to as multi class trash receiving location.

In embodiments herein, RFID technology also enabled new waste collection cost models. Instead of imposing a flat yearly fee for the waste collection service or selling waste bags, a Pay-As-You Throw (PAYT) program can be developed where households pay a variable rate depending on the amount of waste (weight) they produce or recycle. The PAYT program can bill customers each time their waste bin is emptied, debit a prepayment account or by combining bin identification and bin weighing technology, the customer can be billed based on total waste weight. The systems typically include:

1. Central office: The central waste management office includes the central computer which manages the waste system, the customer database to cross reference customer details with waste bin RFID identification number and the wireless communication system to communicate with mobile waste truck or vehicles.

2. Mobile waste truck or vehicle: The mobile waste truck or vehicle includes an RFID reader to read the waste bin RFID identification number, wireless communication system to communicate with central computer, GPS device to identify truck location coordinates, waste bin weigh capability, clock, and display interface for truck driver.

3. Customer RFID enabled waste bin: The customer waste/recycle bin has an RFID tag with a unique identification number. This identification number is associated with the customer details saved in the customer database at the central office.

Embodiments include waste and recycling containers that incorporate RFID tags. The RFID tag can be embedded during the bin manufacturing process or subsequently inserted into a cavity on the bin or affixed to the bin, as disclosed in U.S. Pat. No. 6,191,691.

A customer database is needed to associate each RFID enabled bin via either an RFID tag or RFID Smart label with the customer household. This database is stored on a computer at the waste company central office. When a waste truck starts a new bin collection route, at least a portion of the database is downloaded from the central office computer to the waste truck computer via a wireless communication link. This portion of the database contains the customer details and RFID tag unique identification number for the waste bin collection route for that particular truck for that particular day. This means that the waste truck computer has enough information to complete the waste collection route; however, the waste truck is in regular communication with the central computer via wireless communication link to enable active updating of the database.

As the waste truck lifts each bin, the RFID tag number is read. The database on the truck can cross reference the RFID tag number with the customer household identity. This verification information may be flashed to a driver display screen. The waste collection information associated with the bin lift such as bin weight can be saved to the waste truck computer, additional information such as the time and the GPS co-ordinates of the truck may also be saved. The waste collection information can be transmitted to the central back office computer via the wireless communication link.

A waste management company may have a fleet of 20 trucks. Each truck may lift 1000 waste containers each day; hence the total number of waste containers in the waste company account can easily exceed 100,000. Each of the waste containers must have an RFID tag fitted and the RFID tag identification number needs to be associated with the customer household details in a central database prior to the collection of waste or recyclable materials. Creating this association is a huge infrastructural task and is one of the limiting factors, perhaps the limiting factor, on the pace of deployment of RFID waste and recyclable material collection technology. Additionally, this infrastructural task remains a large maintenance overhead to add new customers and keep the customer database up to date.

Current methods used by the waste industry are prone to error, are slow and quite labor intensive. The association task in the prior art can be broken down into a number of steps, these include:

1. Identify waste bin at customer location;
2. Fit RFID tag;
3. Read RFID tag unique identification number;
4. Create association of RFID identification number and customer details; and
5. Transmit data back to central computer to save to a customer database.

In order to carry out the steps, the prior art requires that someone from the waste company be sent to the customer site to try to identify a customer's bin, which can be problematic if the customer is not at home or there are multiple bins in the same area. Next, an RFID tag has to be fitted to the bin. This is sometimes difficult and cumbersome and may even require tools to screw or rivet the RFID tag to the waste bin. Many individuals cannot perform this task and the waste company often undertakes this task.

Accordingly, the waste company must travel to the customer address and locate the waste bin. If the waste bin does not already have an RFID device, then the RFID device must be fitted to the bin. The RFID tag can be locked to ensure that it cannot be subsequently over-written, or its data changed. The only information stored on/by the RFID tag is the unique identification number. This means that the customer database which is securely located at the waste company central office, is fundamental to the customer identification. A commercially available handheld RFID reader connected to a mobile computer can be used to read and store the RFID identification number. Once back at the central office, the relationship between the RFID tag identification number and customer address/identification must now be established.

In use, additional information such as pickup date field, product field (waste, paper recycle, class recycle, plastic recycle, or the like), and weight field will be added. This information can be transmitted by wireless communication link to a central back office computer to populate the customer database. This prior art process must be repeated at every customer household location. This limits the rate of deployment of waste technology to new customers and in some instances may even force communities to abandon the thoughts of the deployment of that technology. In a rural area, the database population rate can be as low as less than 100 bins per day.

Presently there is no automated method of associating waste or recyclable material container RFID tags with specific customers and their waste/recycling bin, and for populating the waste/recyclable customer cross reference database with the RFID tag information.

There currently appears to be no devices, systems, processes, or methods of marking, tagging, and otherwise identifying waste receptacles and waste containers to maintain the identification of the type of waste contained in each individual waste receptacle and waste container. Further there appears to be no devices, systems, processes, or methods of tracking individual disposable or recyclable waste containers (e.g., plastic bags, paper bags, cardboard boxes) from several points of collection centers. Even further, there appears to be no devices, systems, processes, or methods of maintaining and verifying the custody of separated waste, in particular targeted waste, contained in disposable or recyclable waste containers from the point of collection to the point of recycling to ensure that the waste remains uncontaminated at the time and place of recycling.

While information-technology tools have revolutionized the way many governments and industries operate, the waste management industry has not embraced information technology in the same way. As such, the waste management industry lacks modern, up-to-date information technology tools for efficiently carrying out business management, operations management and other activities associated with recycling (collectively "recycling activities"). In turn, this lack of information-technology has limited municipalities and/or other entities administering recycling programs to provide incentives for entities, such as business, governments, and households, to recycle, to design effective strategies for recycling, to measure performance against such recycling strategies, etc.

Examples (1) A SmartBox or a Master

Figure 1:
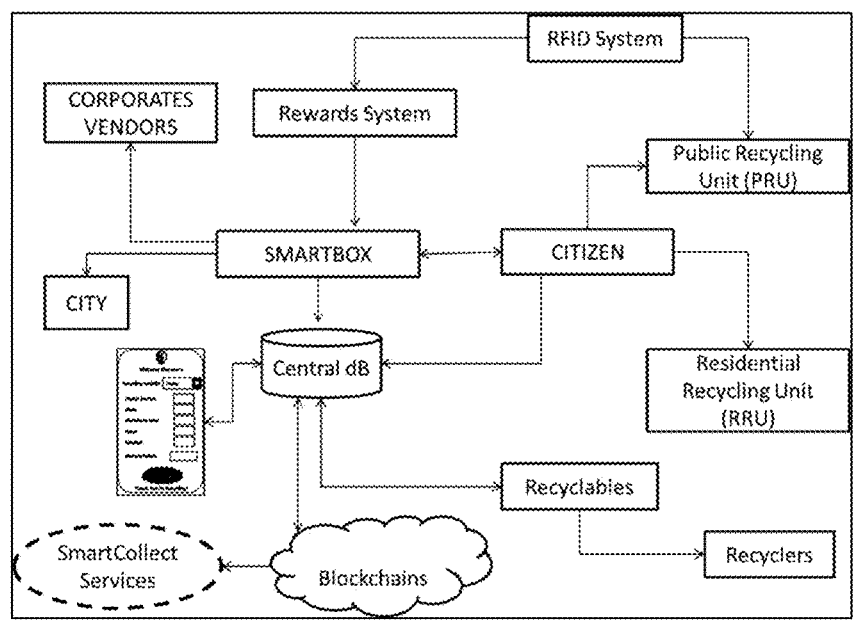

FIG. 1 shows a schematic diagram of SmartBox Ecosystem wherein a citizen is shown interacting with a SmartBox which forms a part of bigger ecosystem where the data from the SmartBox is stored to a central database (DB). This Central DB provides data which can be accessible for a citizen through a mobile App, for SmartCollect Services via Block chains, Recyclers for Recyclables data. The citizens will be recycling through Public Recycling Units (PRU) or Residential Recycling Units (RRU) which are RFID enabled. A reward system is enabled based on the recycling of a citizen. The SmartBoxes are either part of a city or they might be owned completely by corporate vendors.

Figure 2:
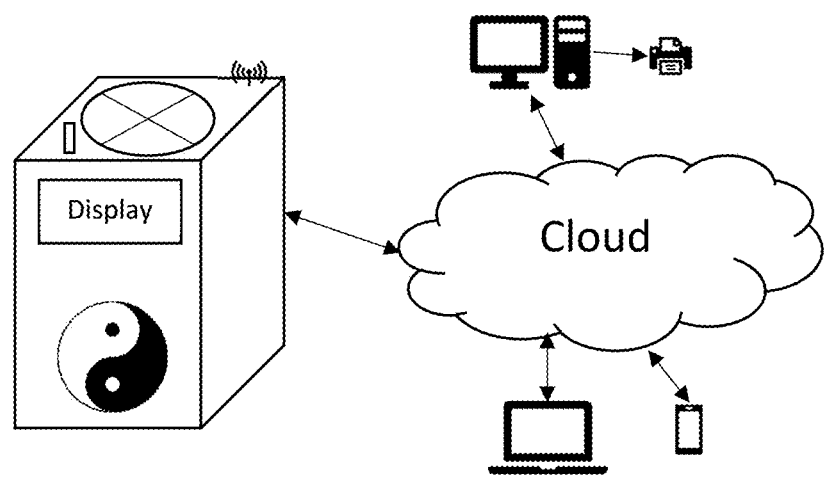

FIG. 2 schematically depicts a SmartBox simplified for waste collection with inlet sensors and depicts the data being transferred to a cloud according to an embodiment. Any device connected with the cloud can access the data and show or print the results on rewards or statistics as desired.

Figure 3:
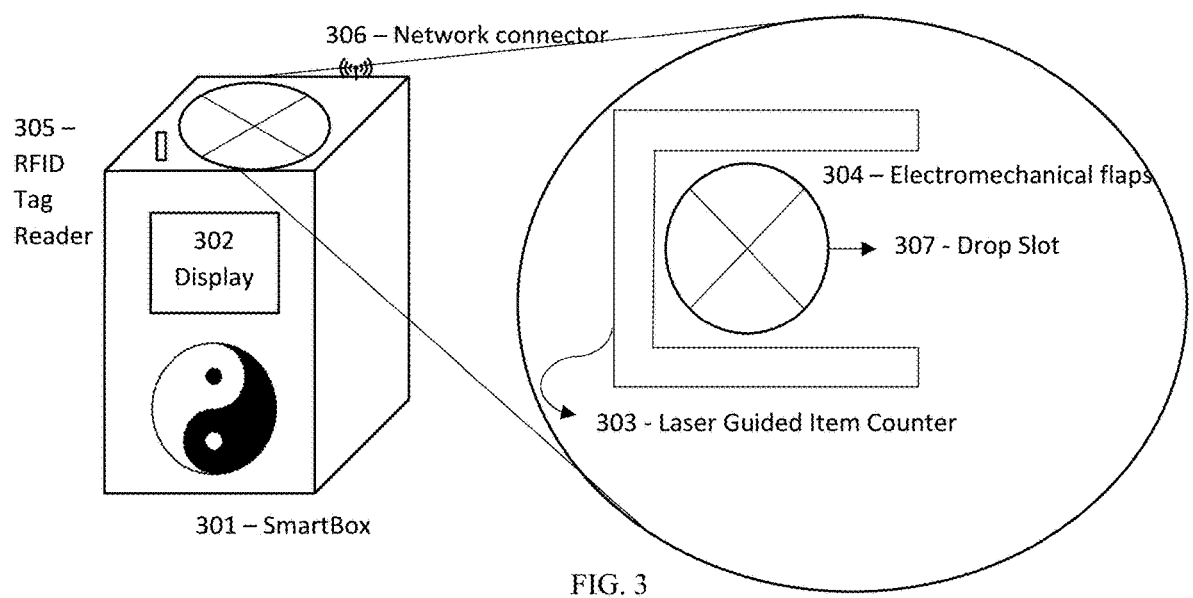

FIG. 3 shows a SmartBox (301) according to an embodiment and is configured to have a Program Logic Controller Display Unit (302), Laser sensors and counters (303), PLC Software, multi-stream recycling inlets (307) with electromechanical flaps (304), RFID tags, RFID Tag readers (305), Network connector (306) and includes Long life Battery pack, Compactors, Solar Panel, Electronic Lock Disposal Mechanism, Raspberry Programmable Boards, Arduino hardware and software and Fill level sensors (which are not shown in this figure). FIG. 3 also depicts a SmartBox item counter and item drop slot as shown in the expanded bubble of the top section. An item can be dropped through the slot and the item counter will initiate the counter and keep tract of the count.

In one embodiment, one or more target trash collection groups are identified, for example, aluminum, glass, paper etc. A receptacle trash can or trash bin, referred here as SmartBox is created capable of receiving one of the identified groups such as cans, glass, paper etc. More than one SmartBox may be utilized depending on the kinds of resources the trash receiving facility may receive. One of these SmartBoxes in a configuration of a plurality of SmartBoxes is designated as Master.

In an embodiment, an RFID tag is associated with customers as well as the SmartBoxes which form a network of waste collection points, to track who is putting the trash and in which receptacle, gathering and storing customer specific information along with recycling data in a central database, access and analyze data, generate incentives and schemes to provide positive feedback to the customers who are recycling by providing various incentives.

In an embodiment, an RFID tag is associated with customers as well as the SmartBoxes from a network of waste collection points, to track who is putting the trash and in which receptacle, gathering and storing customer specific information along with recycling data in a central database on a cloud, access and analyze data, generate incentives and schemes to provide positive feedback to the customers who are recycling by providing various incentives wherein the SmartBoxes comprise of a compactor and run on solar power generated by a plurality of panels arranged on top of the SmartBoxes.

In an embodiment, the SmartBoxes are assembled to create a multi-class trash collection facility for collecting a plurality of recyclable materials.

In an embodiment, the SmartBoxes are assembled to create a multiclass trash collection facility for collecting a plurality of recyclable materials along with a liquid disposal compartment to empty the liquids before discarding to recycle the bottles, soda cans, tins and so forth.

In an embodiment, a multi-stream trash recycling system comprising a plurality of SmartBoxes configured to collect a plurality of recyclable materials, garbage pickup trucks segmented to form compartments that facilitate multi-stream collection of the collected waste, gathering the data, processing, and analyzing the data on trash collection, displaying the recycling or waste management analytics.

In an embodiment, a multi-stream trash collection system or recycling system comprising plurality of SmartBoxes configured to collect plurality of recyclable materials, gathering the data, processing, and analyzing the data on trash collection, displaying the recycling or waste management analytics and using the analytics to enable Customer Relationship Management (CRM) or Enterprise Resource Planning (ERP) software to schedule and route garbage pickup trucks.

Figure 4:
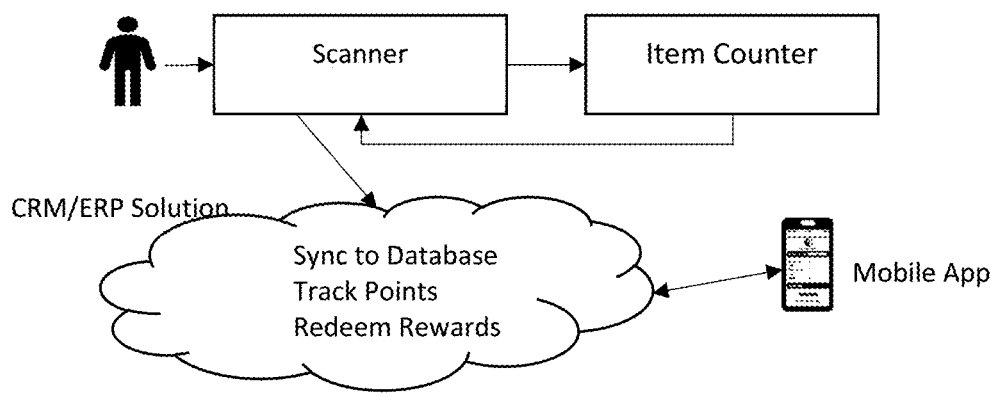
FIG. 4 depicts a SmartBox with a Use Case and Flow Diagram, and Technical Back-end with Hardware and Software Components.

FIG. 4 schematically depicts citizen or customer recognition and recycle data generation. The user or customer or citizen initially will scan his RFID tag and start dropping the items through the counter. The scanner will keep track of the counter and will aggregate the type of item and the count of recycled items to the RFID tag of the specific customer. The data though collected at an individual's level can be configured to be accumulated or aggregated at different levels. The data generated is sent to the database on the cloud storage and synchronized with already existing data sets. This data can be processed and used for downstream operations such as ERP and CRM solutions or for providing a positive feedback on recycling to customers by encouraging them through rewards generated from their recycling or by generating targets for gaining a reward.

In an embodiment, citizens are provided with RFID tags or other identification means which are scanned on the PLC unit which uses the Software to identify the citizen using Arduino software and Raspberry boards. Citizens use the provided multi-stream system to deposit separate recyclables into the bins' compartments covered with flaps which interface with Laser sensors using item counters. The units use long life battery that is powered by the solar panel to power all electronic equipment. A Wi-Fi router is used to connect to the PLC to download data which is stored in the backend database for processing. Optionally, the containers use compactors to compact the waste that is collected in each separate compartment where fill-level sensors detect garbage levels. These sensors are also used to determine when trash has to be disposed. An electronic lock mechanism opens the disposal tray of the bin to collect pre-sorted, compacted trash into a garbage pickup truck.

In an embodiment, a container comprises of sensors to keep track of the person who recycles, what they have recycled, how much they have recycled, the location where they recycled, and provides rewards to them for recycling. Containers are designed to be used in a residential and/or a commercial setting. Containers are equipped with Fill level sensors that send data on when waste needs to be collected. Containers are also equipped with compactors to collect larger volumes of recyclables per container. RFID tags are used to track citizen data. Unique IDs have been assigned to each container which have electronic sensors that are configured to identify and account for each item that is recycled. Implementing Internet of Things (IoT), all containers are connected to a technology framework which consists of servers that utilize programming logic to collect all data from each container, aggregate it and associate it to each individual and perform calculations to produce relevant reports on recycling trends and demographics. Points are assigned to each item that is recycled and converted to rewards that can be redeemed with selected retailers who are part of this ecosystem. Retailers benefit by participating in a green initiative and advertising their products on the containers. The city also benefits by having access to data on recycling and by introducing collection and truck-routing efficiencies in their daily collection routines. This leads to use of lesser number of trucks for collection, reduced consumption of gasoline, reduced emission of greenhouse gasses, less pollution, and less personnel. The technology framework is built on an open architecture to retrofit existing containers from other trash collection companies, also whomever can utilize our framework by leasing it in the future. The programmable logic controller is programmed to use logic to create and implement our process of collection and segregation of recyclables. Sensors are used to detect when an item is deposited in a particular compartment which trigger counters in the PLC. Logic is used to increment counters and store the data in the PLC.

(2) Size and Shape of the SmartBox

Figure 5:
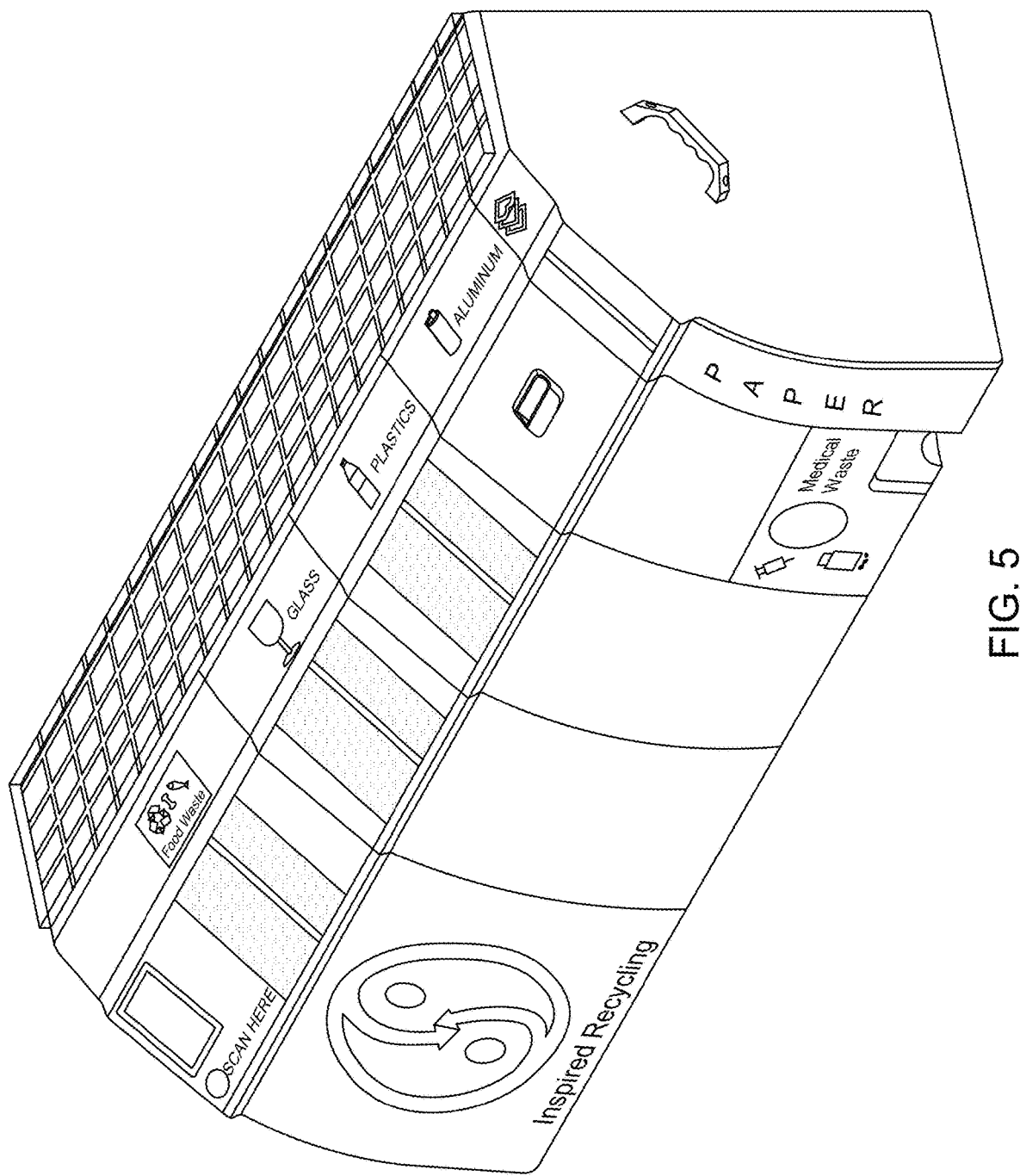
FIG. 5 depicts a SmartBox with Multi-Stream IT-enabled Pre-sorted Recycling Collection System.
Figure 6:
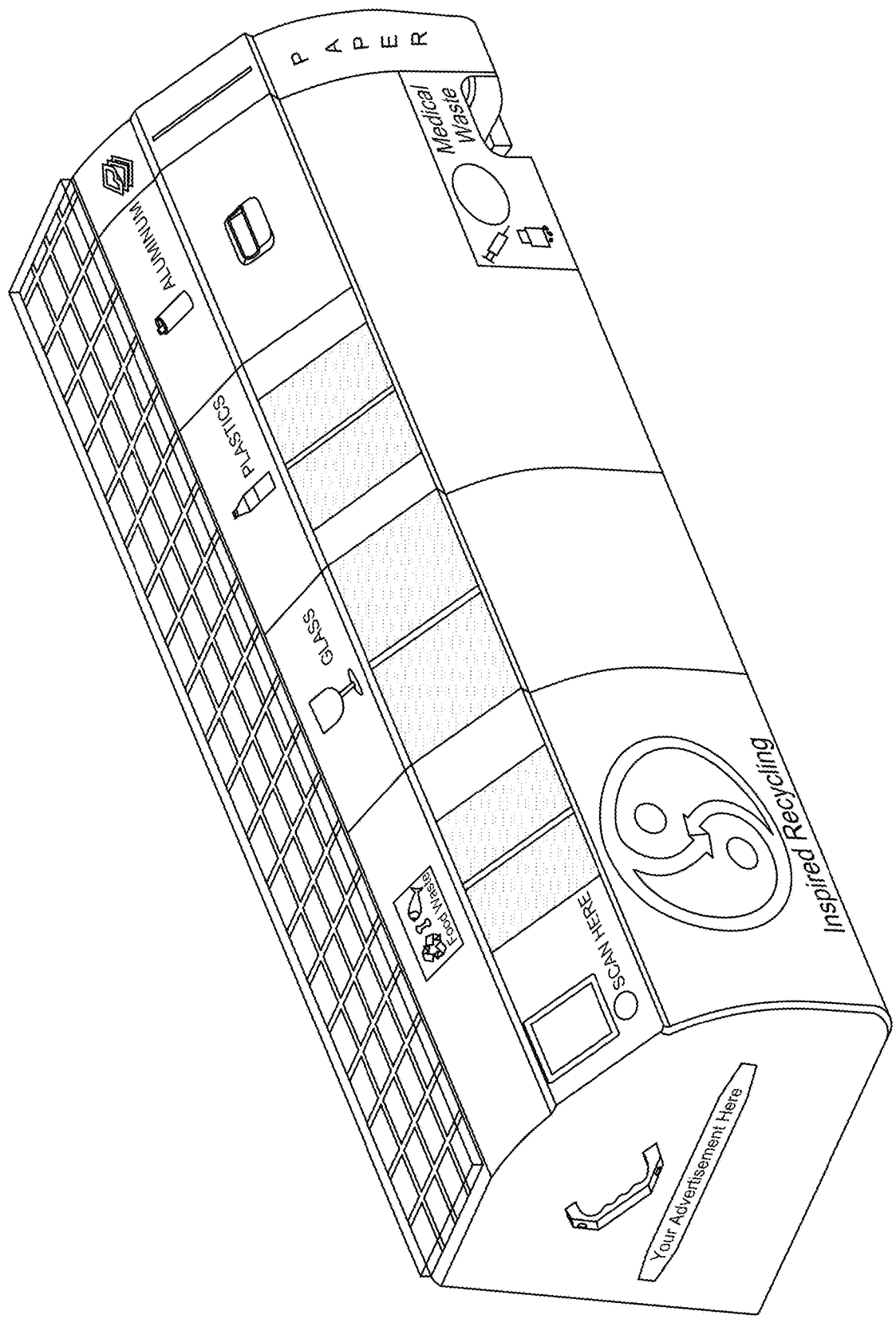
FIG. 6 depicts a SmartBox with Multi-Stream IT-enabled Pre-sorted Recycling Collection System showing Advertising Panels.

FIG. 5 depicts a SmartBox with Multi-Stream IT-enabled Presorted Recycling Collection System and FIG. 6 depicts a SmartBox with Multi-Stream IT-enabled Presorted Recycling Collection System showing side Panels as advertising panels. These figures show a multi-class trash collection facility for collecting a plurality of recyclable materials. According to an embodiment, the collection facility includes a plurality of SmartBoxes, a network, and a host server. A SmartBox may be of any shape or size so long as it is adapted to hold a quantifiable measure of recyclable material. The SmartBox size and modules are configurable to the needs of the location, entity, organization, society, etc.

A SmartBox or Master may be of any size or shape so long as they are adapted to hold the recyclable materials deposited by the entity.

In one embodiment of the present invention, a plurality of SmartBoxes, each SmartBox corresponding to one class of recyclable materials (e.g., paper, plastics, metals, glass, etc.) in which materials of that class may be deposited, are arranged in a horizontal configuration.

In another embodiment, a plurality of SmartBoxes, each SmartBox corresponding to one class of recyclable materials (e.g., paper, plastics, metals, glass, etc.) in which materials of that class may be deposited, are arranged in a vertical configuration.

In another embodiment, a plurality of SmartBoxes, each SmartBox corresponding to one class of recyclable materials (e.g., paper, plastics, metals, glass, etc.) in which materials of that class may be deposited, are arranged in a combination of horizontal and vertical configuration.

(3) Identifying a SmartBox

A SmartBox may be identifiable by an identification tag having a unique identifier. The identification tag may be a card, key frequency operated button (fob), identification means, or the like. The identification tag may be a machine-readable device, such as a bar-code label, a magnetic-strip device, a radiofrequency-identification ("RFID") tag and the like; and may include and/or be programmed with information for identifying the SmartBox, and in turn, information e.g., an address, a bin number, position coordinates, etc. associated with the SmartBox.

A SmartBox is illustrated in FIGS. 2 and 3. The SmartBox is fitted with a tag e.g., RFID tag, barcode tag, printed barcode, or combination. The SmartBox comprises an electronic device for detecting a tag and/or communicating or signalling with a tag. The electronic device can be one or more electronic devices incorporated e.g., moulded into the SmartBox or can be a separate item e.g., Smart cell phone or like cell phone connected to, attached, or otherwise associated with the SmartBox. For example, the electronic device may be moulded e.g., insert moulded, fastened and/or attached e.g., adhered into or onto the SmartBox. The electronic device, for example, can detect or sense a tag of the SmartBox to a reader or scanner provided in one or more electronic devices. For example, an electronic device associated with the container/receptacle/SmartBox is configured to read or scan a tag identity of the SmartBox, the date and time of initialization, location, client information e.g., client I.D., contact information, billing information, waste type, date and time, whether the container is partially filled or fully filled, weight when filled, date and time of removal of container, logging information, and other information that can be communicated e.g., by wire and/or a wirelessly via a communication link comprising one or more of a telephone, local area network (LAN), Bluetooth®, cell, computer network, satellite, Internet, GPS, Cloud to a remote device e.g., personal computer, server, personal electronic device, cell phone, Smart cell phone, iPhone, pad, iPad. Alternatively, the SmartBox is not fitted with an electronic device; however, an electronic device, e.g., RFID reader or scanner, is installed near the location, e.g., collectively for all the SmartBoxes near a central location, to read, scan, communicate and/or signal with the RFID tag. As a further alternative, the electronic device can be the same as, or similar to, a cell phone for communication or operating on a cellular network. The electronic device can comprise a screen, e.g., touchscreen, to view and obtain data similar to a Smartphone, e.g., iPhone, and can be provided with a USB port to communicate or signal with an external electronic device, e.g., data input, data collection, programming. In addition, the electronic device can be provided with electronics for cooperating with the Global Positioning System (GPS) for providing location data of the SmartBox to a remote electronic device.

Alternatively, the identification tag may be a non-machine-readable label or other non-machine-readable device. As such, the identification tag may include an identifier that can be transferred to, e.g., manually entered into, the host server, which in turn, uses the unique identifier to obtain information stored thereon for identifying the SmartBox and the location information. In accordance with embodiments of the present invention, a multi-class trash collection facility is formed with a plurality of SmartBoxes either placed at a single location or at a plurality of locations where a town, city, municipality, organization, or the like, collects recycled materials. In one embodiment, the facility may be a gated property operated by a municipality and opened during predetermined hours.

(4) Identifying a Citizen or Person Placing the Objects

In one embodiment, the person placing the object in the receptacle is identified by reading RFID signals by a device placed on the SmartBox. However, it is also possible to recognize the Citizen by enabling technologies to read the data sent passively by the person or devices associated with the person, such as radio signals, Voice print, facial recognition, fingerprint, retina print, fingerprints on the item being placed in the smart box, heat signature, identifying marks on the body, or other methods. The person may also be identified by an exchange of data between a computing device such as a smartphone and the SmartBox. Such identification may incorporate GPS, Wi-Fi geolocation, signal triangulation, and/or other geolocation mechanisms to verify that the device is proximate to the SmartBox. It is configured to read or scan a tag identity of the customer, date and time of joining the recycling program, location, client information, e.g., client I.D., contact information, billing information, waste type recycled, rewards accumulated, rewards redeemed, date of last recycle, recycle locations and so forth. All the information can be communicated, e.g., by wire and/or a wirelessly, via a communication link comprising one or more of a telephone, local area network (LAN), Bluetooth® cell, computer network, satellite, Internet, GPS, Cloud to a remote device, e.g., personal computer, server, personal electronic device, cell phone, Smart cell phone, iPhone, pad, iPad.

(5) Identifying the Trash Class or Objects being Placed in SmartBox

A SmartBox has an opening where recyclable materials are to be placed. In one embodiment, an item can be dropped through the slot and a laser guided item counter will initiate or increment the counter and keep track of the count.

A SmartBox has an opening where recyclable materials are to be placed. In one embodiment, an item can be dropped through an opening which opens upon identifying the citizen or user and a counter will initiate or increment the counter and keep track of the count.

In one embodiment, a scanner or camera and/or a weight scale may identify and count the materials or objects by computerized object recognition, by reading a bar code, Quick Response (QR) code, or similar code, by performing Optical Character Recognition (OCR) on the text located on the object, by calculating the weight of the object, and optionally in the case of multiple objects, determining whether the objects are similar and/or the individual weights of the objects, or a combination thereof. Additional data may be received via an attached input device, a card reader, and/or via computing devices such as a tablet, a smart phone, a laptop, or a desktop. Such computing devices may be connected via a wide area network or via Bluetooth, near field computing, or similar local communications method. Data may be processed using a local computing device. Similarly, data may be compared to a database on a server and/or sent to a server for further processing.

(6) RFID for the SmartBox and RFID for Citizen

Radio Frequency Identification (RFID) uses electromagnetic fields to automatically identify and track tags attached to objects. The tags contain electronically stored information. Passive tags collect energy from a nearby RFID reader's interrogating radio waves. Active tags have a local power source (such as a battery) and may operate hundreds of meters from the RFID reader. Unlike a barcode, the tags don't need to be within the line of sight of the reader, so it may be embedded in the tracked object. RFID is one method of automatic identification and data capture (AIDC).

A radio-frequency identification system uses tags, or labels attached to the objects to be identified. Two-way radio transmitter-receivers called interrogators or readers send a signal to the tag and read its response. RFID tags can be either passive, active or battery-assisted passive. An active tag has an on-board battery and periodically transmits its ID signal. A battery-assisted passive (BAP) has a small battery on board and is activated when in the presence of an RFID reader. A passive tag is cheaper and smaller because it has no battery; instead, the tag uses the radio energy transmitted by the reader. However, to operate a passive tag, it must be illuminated with a power level roughly a thousand times stronger than for signal transmission. That makes a difference in interference and in exposure to radiation. Tags may either be read-only, having a factory-assigned serial number that is used as a key into a database, or may be read/write, where object-specific data can be written into the tag by the system user. Field programmable tags may be write-once, read-multiple; "blank" tags may be written with an electronic product code by the user. RFID tags contain at least three parts: an integrated circuit that stores and processes information and that modulates and demodulates radio-frequency (RF) signals; a means of collecting DC power from the incident reader signal; and an antenna for receiving and transmitting the signal. The tag information is stored in a non-volatile memory. The RFID tag includes either fixed or programmable logic for processing the transmission and sensor data, respectively. An RFID reader transmits an encoded radio signal to interrogate the tag. The RFID tag receives the message and then responds with its identification and other information. This may be only a unique tag serial number or may be product-related information such as a stock number, lot or batch number, production date, or other specific information. Since tags have individual serial numbers, the RFID system design can discriminate among several tags that might be within the range of the RFID reader and read them simultaneously.

RFID systems can be classified by the type of tag and reader. A Passive Reader Active Tag (PRAT) system has a passive reader which only receives radio signals from active tags (battery operated, transmit only). The reception range of a PRAT system reader can be adjusted from 1-2,000 feet (0-600 m), allowing flexibility in applications such as asset protection and supervision. An Active Reader Passive Tag (ARPT) system has an active reader, which transmits interrogator signals and also receives authentication replies from passive tags. An Active Reader Active Tag (ARAT) system uses active tags awoken with an interrogator signal from the active reader. A variation of this system could also use a Battery-Assisted Passive (BAP) tag which acts like a passive tag but has a small battery to power the tag's return reporting signal.

In one embodiment, smart label RFID technology can be implemented. Smart labels represent the next generation of RFID tags. They have an RFID tag embedded within the label substrate material. Certain such RFID labels are adapted to withstand the harsh waste environment. This RFID label technology enables RFID tag installation on a waste container by attachment of a sticky label to the outer bin surface.

In one embodiment, accordingly, the present invention enables the creation of the Citizen RFID tag and SmartBox RFID tag and enables storing the data collected at these SmartBoxes by the Citizens to a central database. This gives the advantage for associating the trash recycled by the citizen at any of the SmartBoxes located anywhere in this system and not just a single physical location. This further enables refined data generation about how much waste is recycled by a citizen, or at a location or at a city level and what kinds of waste are being recycled. This granularity of data further refines the planning involved of the waste management, with multi-class recycling, system at various levels.

Once the identification process takes place and as the recycling happens, the system is enabled to track who, when, which, where, what and why for recycling, and further provides incentives to those who recycle.

(7) SmartBox with Fill Level Sensors, Compactor and/or Shredder

The typical volume capacity, density and other characteristics of wastes vary from industry to industry and location to location within an industry. It is fairly logical that waste streams or trash profiles with the highest air content achieve the highest benefits from compaction, for example, empty plastic containers, tin soda or food containers. Since trash profiles can vary considerably, the compaction benefits derived from trash compactors will also vary accordingly.

The compaction benefits or volume reduction benefits of various types of waste equipment can vary widely, from a range of approximately 25 to 1 down to a range of about 2 to 1. Trash compactors average a range of up to 25 to 1 compaction ratio down to around 10 to 1. Compactors can be used indoor or outdoor. Using compactors will result in influencing the operational aspects, such as weekly trips required for collecting the dump or refuse and/or design aspects such as reducing the dumpster size for the same volume of dump or refuse collection.

A compactor is a machine or mechanism used to reduce the size of material such as waste material or biomass through compaction. A trash compactor is often used by a home or business to reduce the volume of trash it produces. A baler-wrapper compactor is often used for making compact and wrapped bales in order to improve logistics. Normally powered by hydraulics, compactors take many shapes and sizes. Trash compactors, hydraulic or manual are designed based on the type of use, residential, commercial, municipal, or agricultural use. They reduce the volume of garbage by compressing it in one or more directions.

In an embodiment, a refuse compactor has a housing for containing a garbage receptacle, and a compression unit for compacting the refuse in the compaction unit. It has a fill level sensor such as a wireless ultrasonic sensor, for gauging the level of refuse in the receptacle. When a sufficient bulk is collected or from time to time or as preconfigured instruction, the compression unit operates to compact the refuse. The compression unit is configured based on the load limit of the trash receptacle. The trash compactor is an electromechanical, modular single column with a ram that compresses the waste, and an electrical switch that powers the unit. Optionally, the trash compactor may incorporate additional safety features, such as an alarm that will sound in case of a malfunction or if the bin has been loaded improperly.

In an embodiment, a refuse compactor, a compression unit for compacting the refuse in the compaction unit, is contained within a garbage receptacle.

In an embodiment, a refuse compactor, a compression unit for compacting the refuse in the compaction unit, is contained within a garbage pickup truck or refuse bin itself.

In an embodiment, a refuse compactor has a built-in shredder. The compactor has a receptacle with a receptacle opening for receiving refuse. A shredder has a receive opening accessible from outside of the compactor and a discharge opening located for delivering shredded items into the receptacle. A ram vertically compacts refuse and the shredded items toward a bottom portion of the receptacle.

In an embodiment, the compactor is configured based on the ratio of compaction required or planned.

A SmartBox is incorporated with a mechanism for compaction or for shredding or a combination of both. It is customizable based on the requirement of the location where the multi-class trash collection facility is established or placed.

(8) Display Device on a SmartBox for Displaying Relevant Data

The SmartBox or Master will have a display unit. The Master will have the GPS. It will have a sensory net, and it will have all the electronics built into it. If it is collecting only glass, for example, then there will be an inlet. Citizens walk up to it, identified through RFID, deposit their glass, and walk away, and accrue their collection and points. If a particular entity or a location collects more than one item, for example glass and plastic, one more modular SmartBox is added and has a Master module. Both modules will be connected and will now talk to each other. They will be connected electronically, also, physically as well, which now means that there are two SmartBoxes sitting next to each other and are connected with each other in terms of data collection, aggregation, and display.

In one embodiment, once the item (or items) placed in the SmartBox is (are) identified, recycling information about the person who is recycling is displayed as shown in FIG. 10. The information can be specific to a day or for a specific period as per the predefined settings. This display of information is as well configurable as per the requirement.

In one embodiment, the SmartBox may be configured to display data of the SmartBox collections as shown in FIG.

11 on an aggregate level about the total collections until so far, or until a specific date, or over a duration of time.

In one embodiment, the display is configured to be reset by providing access to specified authorities of waste management stream.

In one embodiment, environmental impact of recycling such item (or items) may be provided to the person placing the item in the SmartBox by displaying such data on a local display and/or on a portable computing device such as a Smartphone.

In one implementation, once the item and one or more persons to credit for recycling have been identified, such data may be transferred via a network connection or, in some cases, via a local connection to another device. Such data may be transferred to a server, in which the server may house or update social networking data, communications systems such as TWITTER®, goal-tracking systems, or other network services. Such data would then be utilized to update an environmental scoring, ranking, or information system. For example, a user's FACEBOOK® page may automatically be updated to show how many tons of carbon dioxide the user has prevented from being emitted during a specific period of days chosen, or a user's TWITTER® feed may automatically be updated every time the user recycles an aggregate of 100 pounds of material since the last update. Contests and/or financial incentives may also be tied to such data. The results of such updates may be shared (and/or their sharing may be approved) via computing devices such as a tablet, a Smartphone, a laptop, or a desktop. Where network connectivity is not available and/or where an additional or different type of feedback is desired, the data may be provided to the user via a printer and/or a magnetic or other type of card reading/updating unit. A printer and/or unit may be attached to the SmartBox to make a stand-alone unit. Where the data is measured by a metering system, such as a measurement of electrical usage, such data may be automatically (or manually) transferred to the system associated with an account and/or person and/or entity, and the social networking, rewards, competitive attributes, and other elements of the system applied to such data.

In one embodiment, the SmartBox may be configured to display data about the competitive neighboring collection units to encourage more collection for the center, either on a local display and/or on a portable computing device such as a Smartphone.

In one embodiment, the SmartBox may be configured to display data on green initiatives either as a social responsibility or as an advertising means for other entities.

(9) Downstream Operations for Multi-Stream Garbage Dump Collection

Figure 7:
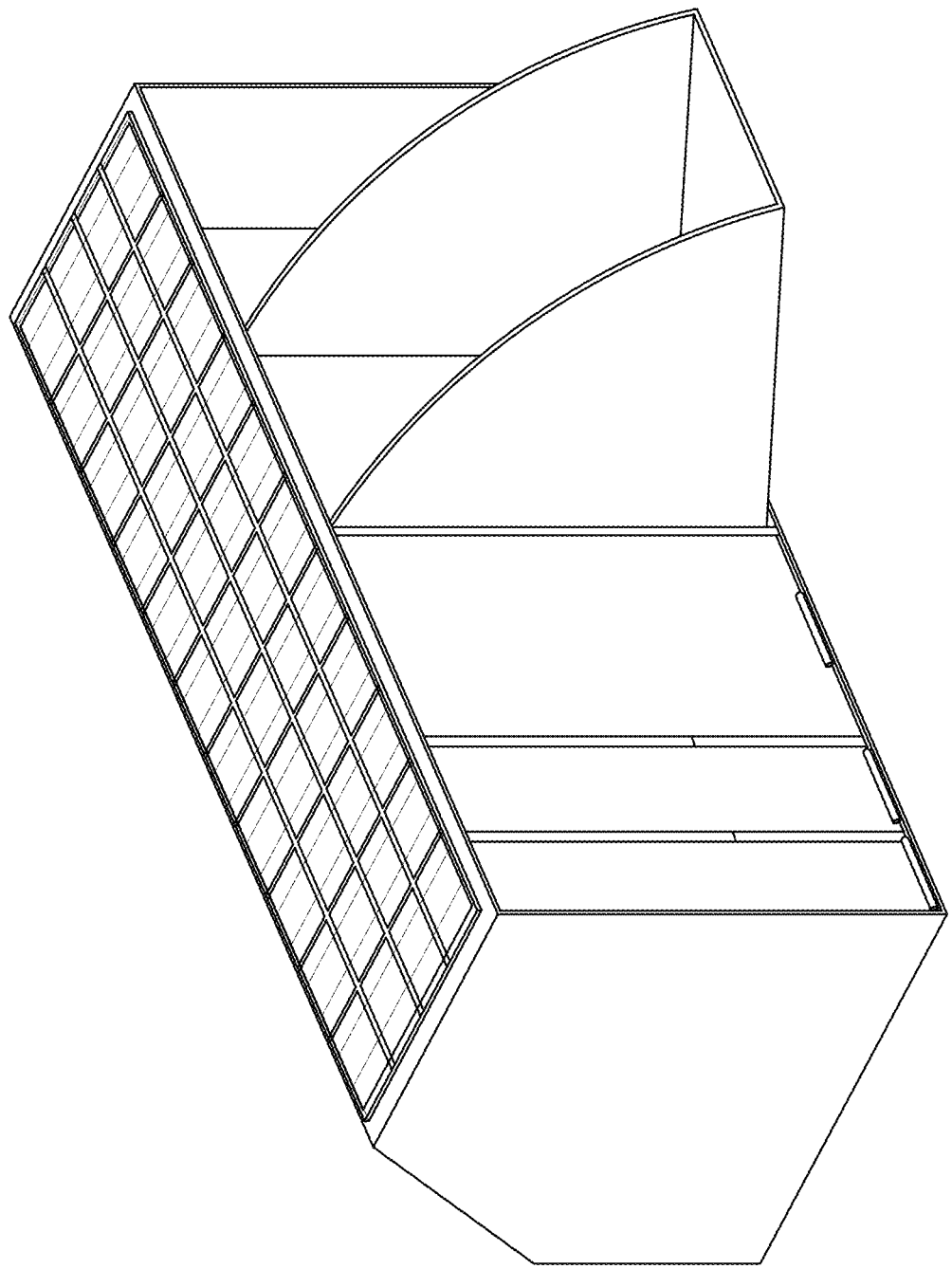
FIG. 7 depicts a SmartBox with In-Built Pre-sorted Recyclables Collection and Disposal Mechanism Back or Front-enable.

In one embodiment, unloading of the multi-stream garbage into dump trucks that collect the waste are configured to be from the back of the SmartBox as shown in FIG. 7. The system is fully enabled for collecting sorted waste using multi-stream garbage dump trucks as shown in FIG. 8, which depicts a SmartBox with Multi-stream Automatic Pre-sorted Waste Dispensing and Collection Trough System, Electronic Opening and Closing Lock Mechanism, Angled and Aligned Compartments to empty into similarly compartmentalized Trucks for Collection and Separation of Waste. In essence, FIG. 8 is schematically showing a Sorted Waste Disposal Trough and Truck System. The slot width and number of items collected in the dump trucks are configured to match the slots of a SmartBox.

In one embodiment, the slot width and number of items collected in the dump trucks are configured to match the slots and number of items collected of a SmartBox partially. For example, the dump truck may be collecting 2 items, however the SmartBox is collecting one item and still the sorted waste is configured to dispose the dump into a particular matched slot on the dump truck.

(10) Data Aggregation and Incentive Generation

In one embodiment, the system is fully enabled in terms of the IoT and is fully enabled in terms of collecting the sorted trash from the Citizen or Individual, collecting sorted waste using multi-stream garbage dump trucks as shown in FIG. 8, and also incentivizing the Citizens which is communicated through a mobile based Application (App) software. A mobile application, most commonly referred to as an App, is a type of application software designed to run on a mobile device, such as a smartphone or tablet computer. Mobile applications frequently serve to provide users with similar services to those accessed on PCs. Apps are generally small, individual software units with limited function.

FIG. 9 schematically depicts a SmartBox Identifying and Associating a Citizen with a Recycling Bin and Items Recycled, Updating a Database, Computing Rewards/Incentives from Retailers. The data is stored in a Central Database which is then used to generate rewards. SmartBox Mobile Application, an App interface according to an embodiment is shown in FIG. 12 to display the registered users upon logging into the system. The data is collected and aggregated from various SmartBox collection points and processed automatically in a manner in which it can give aggregates and class wise recycling efforts at an individual level, SmartBox level, multi-stream collection point level. If the user interfaces with the app, it will greet, "Welcome, Registered Name." The user can then sort the data or visualize the data by bin/SmartBox, by week, or by month. This data is displayed and will also be used to compute and provide incentives. This App will have up-to-date data on individual's past recycling activities. The App, users, or Citizens who are recycling can get points for the recycling from different vendors, accumulate their rewards and incentives, and use or redeem their points as per the redeem instructions.

In an embodiment, using the data on recycling, reward points are calculated. It may be in the form of a link, at the bottom of the user interface, and it will be already tied up with the retail outlets or so many other organizations promoting recycling and green efforts. To redeem the incentive, it can basically be as simple as walking into a Starbucks store and getting a cup of coffee to redeem your points.

In an embodiment, a SmartBox can be used for advertising as shown in FIG. 6, for example to advertise any products on a particular SmartBox. A SmartBox can be kept at a business location or may be put up in a mall to advertise a specific business venture e.g., Starbucks. In the middle of the mall, one may find a SmartBox with a Starbucks logo on two sides of the SmartBox. Thus, they gain advertising. They gain social responsibility if they are undertaking or sponsoring any green initiatives.

Data sent to the servers is utilized to identify a user's account, which user may be an individual or an entity, depending on the application. Once the account is identified or the lack of an account is identified, it is determined whether the user has an account set up to work with the aspects, functions or features as described in the waste management App program. If the user does not have an account set up to work with the aspects, functions or features described herein, such an account is created and/or configured as per the system requirement. The account is then credited with the activity which may be recycling of N number of X item at Y place or SmartBox. Where an individual is part of a recycling team, a corporate team, an affinity group, or some other group or entity or locality that is to share or obtain credit in some manner for the activity, such credit may be recorded in an appropriate additional account, or in more than one additional account, as per the recycling credit sharing or aggregating schemes.

(11) Other Possible Types of Incentives

After processing data via a server or other computerized mechanism, and/or after obtaining such data and transmitting it via a network via Wi-Fi antenna or other mechanism, there are many ways the incentives will be generated.

In an embodiment, leader boards, virtual rewards, social network postings, and other feedback or interactive data may be displayed on a variety of devices, including tablets, portable devices, laptops, desktops, or other display devices. Furthermore, raw data about the recycling activity and/or processed data such as leader boards, virtual rewards, social network postings and other feedback or interactive data may be displayed at or near the receptacle via the use of an attached display and/or transmission via local network, WAN, internet, Bluetooth, Wi-Fi, near-field communication NFC, or other mechanism to other nearby devices including tablets, portable devices, laptops, desktops, or other display devices. Where there is no network connection, or for other reasons it is desired to record recycling data in another manner, data may be printed via a printer attached to, or otherwise associated with or near, the receptacle. Alternatively, or additionally, data may be recorded via a card writer to a magnetic card, a Universal Serial Bus (USB) Stick, a memory card, or other device or card capable of holding data.

In one embodiment, credit for recycling items may be recorded on paper (or on a memory card, magnetic card, or other data device) in a manner that is analogous to a 'bearer instrument'. This credit may be encoded, such as by bar code or QR code, and may have an associated password, among other ways, via an input device. The user may then exchange the bearer instruments with other users, to aggregate them, or treat them generally in the manner the user desires. When the bearer decides to obtain credit for his or her account, the user scans the code, enters the codes printed on the document, inserts the card into a reader, or otherwise identifies the data to a computing system. In one embodiment, the code is consumable; such that once it is used, it is no longer valid for any additional use. In one embodiment, a reward may be given via a local device such as a printer, and may be transmitted via displayed code, such as a QR code located on a local display, or may be transmitted via a network to a computing device such as a portable phone or may otherwise be given. Such reward may be conditioned on, or tied to, recycling of a specified type of material, brand, or product. For example, PEPSI® may hold a promotion wherein the user obtains a coupon via a printer for a free PEPSI® 16-ounce bottle for every 20 PEPSI® products they recycle.

In one implementation, by aggregating bearer instruments showing recycling, such recycling activity can be done anonymously and/or without connection to an account, all without requiring such activity to be done in a single session in order to earn the reward. In another aspect, refillable or rechargeable items may be identified, and the user given the opportunity to recharge or refill them. For example, PEPSI® may sponsor a program whereby a liter or larger size PEPSI® product may be identified and the user offered a discounted (or free) refill. Such product may be refilled via issuance of a coupon, via mechanism attached to or associated with the receptacle, or otherwise. Optionally, material that has been refilled may be marked, or a unique code associated with the material recorded in a database, and limitations placed on additional refills.

In one embodiment, a post such as a Tweet or a FACEBOOK® post may be made, which may optionally be conditioned on user approval and/or meeting other criteria.

In one embodiment, achievements are noted that are in quantifiable terms easily identifiable by humans. In a further aspect, such achievements are posted at set numbers. For example, recycling activity overall may be reported in tons of carbon dioxide saved, and posts made every 1,000 pounds. Can recycling may be reported in kilowatt hours of energy saved, and posts made every time the user saves the average electrical use of a family for one week; newspaper recycling may be reported in pounds of paper and a post made every time a user has saved a full tree worth of paper. In one aspect, the user may set criteria for posting. In addition, or alternatively, the data may be presented in a constant manner, such as in a graphic that loads with their FACEBOOK® news feed. Another element may be virtual or physical rewards for recycling activity.

In one embodiment, users of a game and/or virtual environment, such as a 3D virtual world, Zynga's FARIVIVILLE®, or other environment, may be credited with in-game goods, services and/or status based in whole or part on recycling activities. Such activities may be aggregated with those of other players or groups of players. In one aspect, elements saved in the physical world may be given to players in some related form (either related in quantity, quality, type, or a combination). For example, a player who saves 100 pounds of metal by recycling cans may be given 10% of that savings in the form of steel for forging Swords in WORLD OF WARCRAFT®. Similarly, a player who saves 5% of a tree by recycling paper may earn a tree in FARMVILLE®. Energy savings, pollution avoided, and other measures may be associated with virtual goods or services. Such rewards may be calculated formulaically, may be stored in a database, may be identified on the items themselves; may be identified programmatically, or a combination thereof. A random or chance factor may be utilized to identify the rewards, to modify the rewards, or to otherwise impact or alter the rewards and/or the timing of the rewards. In one aspect, a virtual recycling program may be implemented, where recycling activities in the physical world are rewarded in a virtual environment. Recycling of items in the physical world may result in crediting of the same items in their original form in a virtual world, in a modified form, in their recyclable form, as the corresponding raw materials and/or energy savings, and/or in a form that corresponds to what the materials (or, in an aspect, similar materials) may be repurposed into after recycling. Similarly, energy savings or savings of other resources may be reflected in a virtual environment.

(12) Solar Panel for Battery Recharge and/or Electronics

The system can also include a battery for powering the sensor and the processor. In some embodiments, the system can also include a solar panel connected to the battery. The solar panel can be electrically connected to the battery. For example, the solar panel can be connected with a wire to the battery. Moreover, the system can also include one or more additional sensors, a display, an antenna, a receiver, a transmitter, one or more additional processors, etc. In some configurations, a transmitter in the system can be configured to communicate with a remote device, and the processor can be configured to control operations of the transmitter. The transmitter can be configured to send a warning message to the remote device or receive instructions, such as operating instructions and/or preferences, from the remote device. In some cases, the warning message can be based on a battery status and/or a fullness status of the bin, for example.

(13) SmartBox Communication and Data to the Cloud Storage

A waste recycling communication network is illustrated in FIG. 1 and FIG. 9. SmartBoxes are connected with IoT via other technologies to backend framework. The SmartBox is located to collect waste or trash. A RFID tag associated with or applied to a SmartBox is read or scanned by an RFID READER. The tag communicates information to the server and/or the LAN (Local Area Network). It is noted that a direct communication link between the tag and the RFID reader can eliminate the need for the electronic device; however, the electronic device can provide many additional features and types of communication connections or links. Alternatively, the electronic device of the SmartBox is configurable to connect or link with the Server, LAN, Cellular network, Cloud, and/or remote computer or device. The communication connections or links between the RFID reader, server, Lan, Cellular Network, Cloud, and/or remote computer/device are either configured to be wireless or alternatively, can be wired together. Further, other types of communication links such as microwave, satellite, Bluetooth®, and other types now associated with cellular Smartphones can be added, substituted, augmented, or used serially and/or in parallel.

FIG. 9 shows identifying and associating a citizen with a recycling bin. The data from the SmartBox is received within a computer system. The content of the data is identified. The data may include data about the recycled article and/or data about the person or entity placing the article in the receptacle and the data of the receptacle itself. Such data is sent via a network connection to one or more servers, such as a computer for processing data, an e-commerce server, a web server, a database server, or another type of computer or server.

In an embodiment, the solution can be extended to calculating the weight from the quantity of the refuse or by collecting the data through measuring the weight of recycled items either before collection or after collection and to understand exactly how much was retrieved from the citizen.

In an embodiment, consumption patterns, which gives heuristics, can be analyzed for predictions for future and for providing the city with intelligent data for waste management.

(14) Liquid Disposal Compartment

In an embodiment, a liquid disposal compartment is incorporated. A liquid disposal compartment will be made to collect small amounts of liquids to be disposed in before recycling the bottles, or cans, etc. This compartment will have two options: Option1: the compartment will have a fill level sensor and as soon as this level is reached the inlet will close to indicate that the compartment is full. This will be for implementation at malls, cafeterias, movie halls, etc. where people may consume water or soda. It is only to provide the option to drain some remaining liquid. Option2: for implementations in airports and in places where there is a drainage system available, the liquids will be tapped into the plumbing system. These SmartBoxes will be fixed, with doors in the front and collection will be done from the front. The container will have a compartment for dispensing liquids but in this one, there will be a plumbing pipe tapping into an existing drainage system.

(15) Medical Waste Container

Medical waste is generated from medical and biological activities, such as the diagnosis, prevention, or treatment of diseases. Producers (or generators) of medical waste include veterinary clinics, health clinics, funeral homes, nursing homes, hospitals, medical research laboratories, physician offices, dentists, and home health care.

Generally Medical waste is classified as; healthcare waste that may be contaminated by blood, body fluids or other potentially infectious materials and has the potential (left untreated) to harm humans, animals, or the environment. This type of waste is often referred to as regulated medical waste, biomedical waste, or simply medical waste. The classification of medical waste can vary from state to state. Medical waste is primarily regulated by state environmental and health departments. There are other federal agencies that have regulations regarding medical waste. These agencies include CDC (centers for disease control), OSHA (Occupational Safety and Health Administration), the FDA (U.S. Food and Drug Administration) and other potential federal government agencies (Department of Transportation DOT, for example).

In an embodiment, a container for medical waste is incorporated. The medical waste container will allow users to dispose of medical waste. The compartment is configured to have a fill level sensor that will shut the inlet when it is full and indicate to empty it. This container can be individually accessed for collection by trained personnel.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A trash collection device comprising: a trash receptacle; a unique identification number; an opening to receive a class of trash; a Global Positioning System; an identification scanner configured for recognizing a user; a trash item identifier and a trash item counter; a fill level sensor; a display configured for the user to interact; a compactor; a solar panel configured to charge a battery; a data communicator configured to communicate data to a cloud storage; a processor configured to generate incentive for the user; a trough system, arranged on an opposite side to a side having the opening to receive the class of trash, configured for an outward sweep for emptying trash directly and automatically to a garbage pickup vehicle; wherein the trash collection device is configured to be an Internet of Things device; wherein the trash collection device is powered by the battery; and wherein the trash collection device is configured to be modular and configurable to connect with a second trash collection device to enable to collect an additional trash class and is configured to interact through a common software.

2. The trash collection device of claim 1, wherein the trash item identifier comprises at least one of a camera, a weight sensor, a bar code scanner, a Quick Response code scanner, and an Optical Character Recognition system.

3. The trash collection device of claim 1, wherein the data further comprises an identification sequence, a combination of a first date and a first time of initialization, trash collection device location information, client location information, a client identification information, a contact information, a billing information, a trash type being recycled, a current date and a current time, trash receptacle fill information, a weight information of trash in the trash receptacle, a second date and a second time of removal of the trash receptacle, and a log information.

4. The trash collection device of claim 1, wherein the identification scanner comprises one of a Radio Frequency Identification tag, a radio signal, a voice print, a facial recognition, a fingerprint of the user, a retina print, the fingerprint of the user on a trash item being placed in the trash collection device, a heat signature of the user, an identifying mark on a body part of the user, an exchange of data between a smartphone, and a geolocation mechanism to verify proximity.

5. The trash collection device of claim 1, wherein the trash item counter comprises a laser guided scanner.

6. The trash collection device of claim 1, wherein the fill level sensor comprises a wireless ultrasonic sensor.

7. The trash collection device of claim 1, wherein the trash collection device further comprises a shredder.

8. The trash collection device of claim 1, wherein the data communicator is configured to communicate to the cloud storage through a wireless network.

9. The trash collection device of claim 1, wherein the trash collection device is configured to empty trash to the garbage pickup vehicle through the trough system configured for opening for unloading the trash through automatic electronic opening and closing lock mechanism.

10. The trash collection device of claim 1, wherein the data on the cloud storage from the trash collection device is configured with a mobile application for interaction of the user to read statistics of the user on recycling and to redeem rewards of the user.

11. The trash collection device of claim 1, wherein the display is configured to be digital display and touch sensitive and is further configured to display green initiatives and social campaigning on environmental impact of recycling.

12. The trash collection device of claim 11, wherein a trash collection facility comprises at least one of the trash collection device that is interconnected to a network having access to a centralized database.

13. The trash collection device of claim 1, wherein the trash collection device is further configurable to collect liquids.

14. A system comprising:
a first trash collection devices comprising: a trash receptacle; a unique identification number; an opening to receive a class of trash; a Global Position System; a trash item identifier and a trash item counter, a trough system, arranged on an opposite side to a side having the opening to receive the class of trash, configured for an outward sweep for emptying trash directly and automatically to a garbage pickup vehicle; wherein the first trash collection device is configured for communicating with second trash collection device over a wireless network;
a database comprising, registered users; and data on recycling by the registered users;
a processor configured to interact with a cloud storage to process and analyze the data on recycling;
a mobile application to interact with the cloud storage and generate a user statistic on recycling by the registered users;
a reward system, wherein the reward system is based on the data on recycling;
wherein the registered users are enabled to deposit the trash at a first location of the first trash collection device and/or a second location of the second trash collection device; and
wherein the first trash collection device and the second trash collection device are Internet of Things (IoT) devices.

15. The system of claim 14, wherein the system is configured to add a new trash collection device.

16. The system of claim 14, wherein the processor is further configured to generate an incentive based on the data on recycling by the registered users or generate targets for gaining the incentive for the registered users.

17. A multi-stream system comprising:
a plurality of trash collection devices, wherein each of the plurality of trash collection devices comprises a Global Positioning System and is configured to collect a class of trash;
wherein each of the plurality of trash collection devices is comprising a trough emptying system, arranged on an opposite side to a side having an opening to receive the class of trash, configured for an outward sweep for emptying trash directly and automatically to a garbage pickup vehicle;
wherein the plurality of trash collection devices communicating with each other over a wireless network;
a database for storing data on recycling to a cloud storage by the plurality of trash collection devices and/or retrieving the data on recycling from the cloud storage by the plurality of trash collection devices;
a processor configured to interact with the cloud storage to process and analyze the data from the plurality of trash collection devices; and
the garbage pickup vehicle comprising plurality of segments configured to pick up a multi-class garbage, wherein each of the plurality of segments is configured to collect an individual trash class; and
wherein each of the plurality of segments of the garbage pickup vehicle are configured to match a dimension of each of the plurality of trash collection devices.

18. The multi-stream system of claim 17, wherein each of the plurality of trash collection devices is configured to open independently of other trash collection devices and are configured to interact with the garbage pickup vehicle through a common software.

19. The multi-stream system of claim 17, further comprising at least one of a Customer Relationship Management (CRM) software program and an Enterprise Resource Planning (ERP) software program, wherein the data is used to schedule and route the garbage pickup vehicle.

20. The multi-stream system of claim 17, wherein the trough emptying system comprises an automatic electronic opening and closing lock mechanism and is configured to angle and align the dimension of at least one of the plurality of trash collection devices to empty into at least one of the plurality of segments of the garbage pickup vehicle during collection of waste.

* * * * *